(12) United States Patent
Basnayake

(10) Patent No.: US 8,473,196 B2
(45) Date of Patent: Jun. 25, 2013

(54) USE OF SELF AND NEIGHBORING VEHICLE GPS/GNSS DATA TO ESTIMATE CURRENT AND APPROACHING SKY VISIBILITY CHANGES

(75) Inventor: Chaminda Basnayake, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 13/025,437

(22) Filed: Feb. 11, 2011

(65) Prior Publication Data

US 2012/0209519 A1   Aug. 16, 2012

(51) Int. Cl.
*G01C 21/30* (2006.01)

(52) U.S. Cl.
USPC .......................................... 701/412; 701/410

(58) Field of Classification Search
USPC ............... 701/208, 457, 532, 421; 342/357.3; 455/12.1; 356/5.01; 370/331
See application file for complete search history.

(56) References Cited

U.S. PATENT DOCUMENTS

| | | | |
|---|---|---|---|
| 6,169,881 B1 * | 1/2001 | Astrom et al. | 455/12.1 |
| 6,580,390 B1 * | 6/2003 | Hay | 342/357.31 |
| 8,068,463 B2 * | 11/2011 | Chen et al. | 370/334 |
| 2009/0030605 A1 * | 1/2009 | Breed | 701/208 |
| 2010/0302096 A1 * | 12/2010 | Ammann et al. | 342/357.25 |
| 2011/0249251 A1 * | 10/2011 | Lynch | 356/5.01 |
| 2011/0292910 A1 * | 12/2011 | Lee et al. | 370/331 |
| 2011/0307171 A1 * | 12/2011 | Waite | 701/208 |
| 2012/0209519 A1 * | 8/2012 | Basnayake | 701/457 |

* cited by examiner

*Primary Examiner* — Thomas Black
*Assistant Examiner* — Robert Payne
(74) *Attorney, Agent, or Firm* — John A. Miller; Miller IP Group, PLC

(57) ABSTRACT

A method and system for creating a sky visibility map, using data from a vehicle and its neighbors. A host vehicle with satellite-based navigation capability measures the quality of signals it receives from available satellites, where azimuth and elevation angles of the satellites are known from an ephemeris or almanac. The host vehicle also receives satellite signal data from surrounding vehicles via vehicle-to-vehicle communication. Using data from all of the vehicles, a sky visibility map is constructed, indicating where obstructions to satellite visibility exist for different locations. The sky visibility map is used to anticipate satellite signal quality. A driving environment classification can be used to configure other vehicle systems. The sky visibility map can also be constructed without using data from surrounding vehicles; the host vehicle can store its satellite signal data long-term and use it to estimate satellite visibility when returning to a location previously visited.

16 Claims, 4 Drawing Sheets

USE OF SELF AND NEIGHBORING VEHICLE GPS/GNSS DATA TO ESTIMATE CURRENT AND APPROACHING SKY VISIBILITY CHANGES

BACKGROUND OF THE INVENTION

1. Field of the Invention

This invention relates generally to in-vehicle satellite navigation systems and, more particularly, to a method for estimating availability of signals from navigation satellites in which a host vehicle uses its own satellite signal quality information along with signal quality information from surrounding vehicles to create a sky visibility map.

2. Discussion of the Related Art

Many modern vehicles include navigation systems which use satellite-transmitted data to determine their latitude, longitude, and elevation—or similar location data in a different format, such as north and east offset with respect to a given origin. The Global Positioning System (GPS) in the United States is one example of these types of satellite navigation systems, collectively known as Global Navigation Satellite Systems (GNSS). Vehicles use the location data for embedded navigation purposes, and for other applications.

In order for a vehicle to determine its location using only GNSS, it must be able to receive signals from at least four satellites simultaneously. With additional aiding information such as height data provided using another system or sensor, this requirement may be reduced to three satellites or even fewer. There are normally several satellites which are theoretically visible to a vehicle at any given time, but some of the satellites may be at low apparent elevation angles, and thus may be obscured by some obstruction, such as a building or trees. Because the satellite signals follow a line of sight from the satellite to the receiver, these obstructions can diminish signal quality or completely block some signals. If some satellite signals are blocked, and a vehicle does not have good signals from four or more satellites, the vehicle will temporarily lose its location fix. This will cause a disruption in GNSS-based navigation capability, and will impact any other applications which use the location data.

There is an opportunity to share GNSS satellite data among a group of GNSS users who are in close proximity, such as in a vehicle-to-vehicle (V2V) network, to enable the construction of a sky visibility map. The sky visibility map would allow a vehicle to anticipate satellite signal availability, minimize the negative impact of satellite signal loss, and configure other vehicle systems to the current and approaching driving environment.

SUMMARY OF THE INVENTION

In accordance with the teachings of the present invention, a method and system are disclosed for creating a sky visibility map, using data from a host vehicle and its surrounding vehicles. A host vehicle with satellite-based navigation capability measures the quality of signal it receives from all available satellites, where the azimuth and elevation angles of the satellites are known from a system ephemeris or almanac. The host vehicle also receives satellite signal data from surrounding vehicles via a vehicle-to-vehicle communication network. Using data from all of the vehicles, a sky visibility map can be constructed, indicating where obstructions to satellite visibility exist for different locations on the map. The sky visibility map can be used to anticipate satellite signal quality, and a driving environment classification can be used to configure other vehicle systems. The sky visibility map can also be constructed without using data from the surrounding vehicles, in that the host vehicle can store its satellite signal quality data long-term and use it to estimate satellite visibility when returning to a location previously visited.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for constructing a sky visibility map is merely exemplary in nature, and is in no way intended to limit the invention or its applications or uses.

Global Navigation Satellite Systems (GNSS) is the generic name given to satellite-based navigation systems. The Global Positioning System (GPS) in the United States, and GLONASS in Russia are examples of fully operational Global Navigation Satellite Systems. Systems in Europe (Galileo) and China (Compass) are also planned for full GNSS capability. Using GNSS, a receiver device can determine its location (latitude and longitude) and elevation, as long as it can receive a signal from four or more GNSS satellites simultaneously. This is the case in standalone GNSS operation as the receiver has four unknowns to estimate, three position unknowns and the timing error. GNSS aiding techniques may reduce this requirement to three or even fewer satellites, if some unknown information is provided by other means. Examples of this include providing the height or precise timing information with other sensors or sources. A GPS receiver in the United States, as an example, may have visibility to six or more satellites simultaneously. Vehicles, aircraft, and boats commonly use GNSS devices for navigation and other location-related applications.

Figure 1:
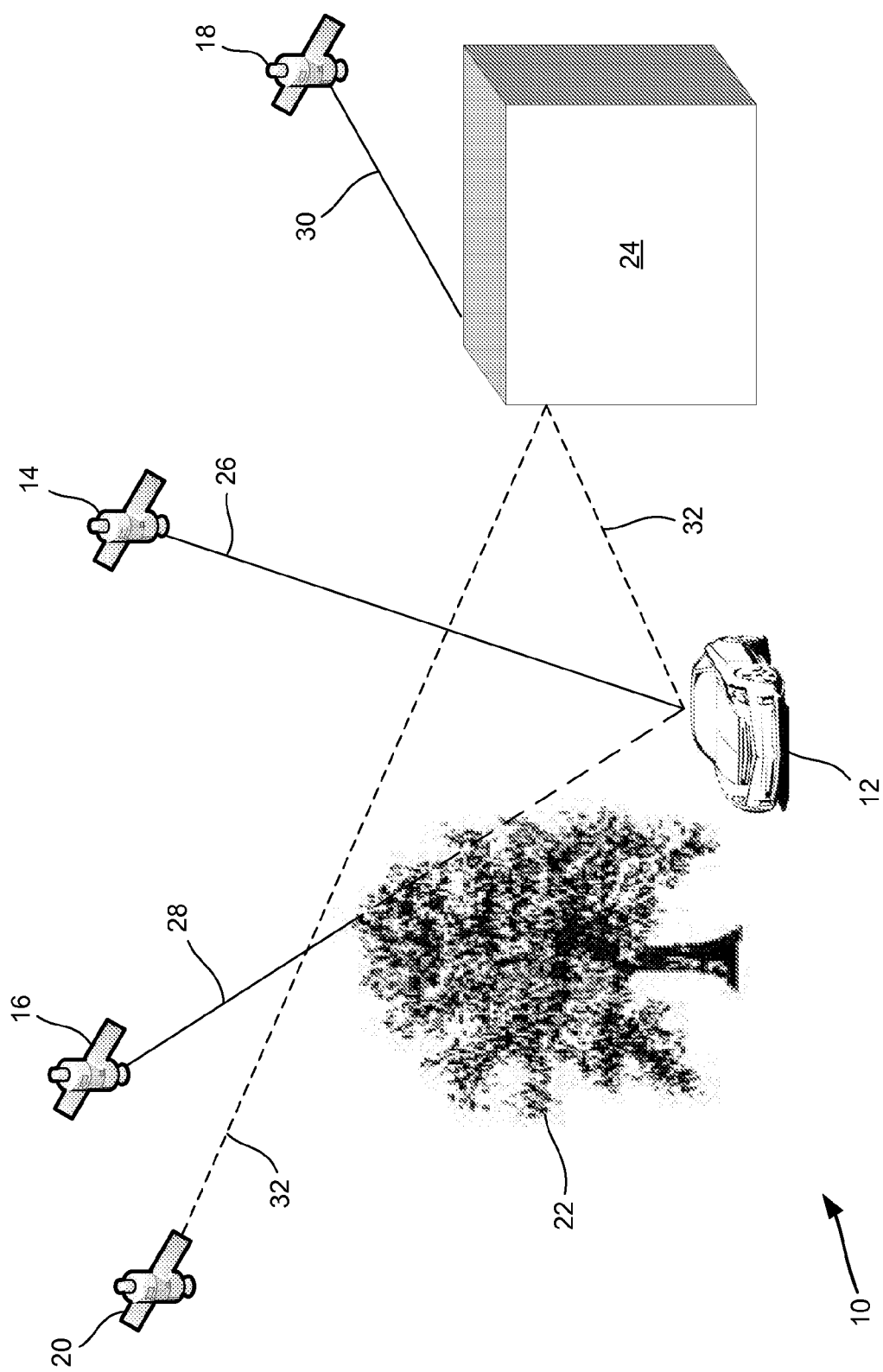
FIG. 1 is an illustration of a vehicle and its potential reception of signals from GNSS satellites.

FIG. 1 is an illustration of a scenario 10, showing a vehicle 12 and its potential reception of signals from GNSS satellites 14, 16, 18, and 20. The satellite 14 has a clear line of sight to the vehicle 12 via path 26. The satellite 16 has a path 28 to the vehicle 12 which is partially obscured by a tree 22. In this situation, the vehicle 12 would receive a weakened and possibly intermittent signal from the satellite 16. Signal strength is commonly measured in terms of signal-to-noise ratio, where a higher signal-to-noise ratio indicates a greater signal strength. The satellite 18 does not have a clear line of sight to the vehicle 12, as path 30 is blocked by building 24, which is impervious to the satellite signal. Thus, no signal from the satellite 18 reaches the vehicle 12. The satellite 20 also does not have a clear line of sight to the vehicle 12, as a straight path would be blocked by the tree 22. However, the vehicle 12 could receive a reflected signal from the satellite 20 via path 32. The reflected signal would be weaker—and therefore have a lower signal-to-noise ratio—than a direct line of sight signal. The scenario 10 illustrates some of the situations frequently encountered by vehicles equipped with GNSS receivers. The vehicle 12 in the scenario 10 would likely have no GNSS capability in this location, as it is only receiving one clear signal, from the satellite 14, and two compromised signals, from the satellites 16 and 20.

A GNSS ephemeris or almanac is a set of data that is transmitted by GNSS satellites, and it includes information about the state (health) of the entire GNSS satellite constellation, and data on every satellite's orbit. An ephemeris is a precise subset of the information contained in a GNSS almanac, typically refined for a short time period, such as 2 hours. The almanac provides less precise information that could be valid for a longer period of time. When a GNSS receiver has current ephemeris or almanac data in memory, it can acquire satellite signals and determine initial position more quickly. The GNSS almanac also includes GNSS clock calibration data, and data to help correct for distortion caused by earth's atmosphere. Thus, the vehicle 12, by virtue of the GNSS ephemeris or almanac data, knows that in unobstructed surroundings it should be able to receive signals from the satellites 14, 16, 18, and 20. The partially obscured signal from the satellite 16 indicates that a porous object, such as the fringes of the tree 22, exists along the path 28. The complete absence of a signal from the satellite 18 indicates that an impervious object, such as the building 24, exists along the path 30. Likewise, the lack of a direct signal from the satellite 20 indicates the presence of an obstruction between the satellite 20 and the vehicle 12, in this case the full breadth of the tree 22.

While the vehicle 12 would not know exactly what type of obstruction is blocking some GNSS satellite signals, it would know that some obstruction exists in the location of the tree 22 and the building 24, at least at the instant of time depicted in the scenario 10. Accumulating this obstruction information at many locations over time allows the vehicle 12 to construct a sky visibility map containing data about obstructions along roadways. This data can be used to anticipate GNSS signal blockages, and for other applications, as will be discussed below.

Vehicle-to-vehicle (V2V) and vehicle-to-infrastructure (V2I) communications, collectively known as V2X, have become increasingly popular as a next generation application in the automotive marketplace. V2X communications are an emerging type of networks in which vehicles and roadside units are the communicating nodes, providing each other with information, such as safety warnings and traffic information. V2X communications allow vehicles to communicate with other vehicles, infrastructure, and even pedestrians, using Dedicated Short Range Communications (DSRC) or other wireless communications technologies, at ranges up to about a half mile. Many vehicles are likely to become equipped with V2X communications capability in the near future. They will continuously transmit information which may be useful to other vehicles. GNSS data, including vehicle location, satellite signal reception status, and other satellite measurement data such as pseudorange and carrier phase measurements, can be transmitted by vehicles participating in a V2X network according to SAE J2735 or an equivalent standard. If the vehicle 12 receives GNSS signal data from other vehicles in the V2X network, the sky visibility map can be constructed much more quickly and completely.

Figure 2:
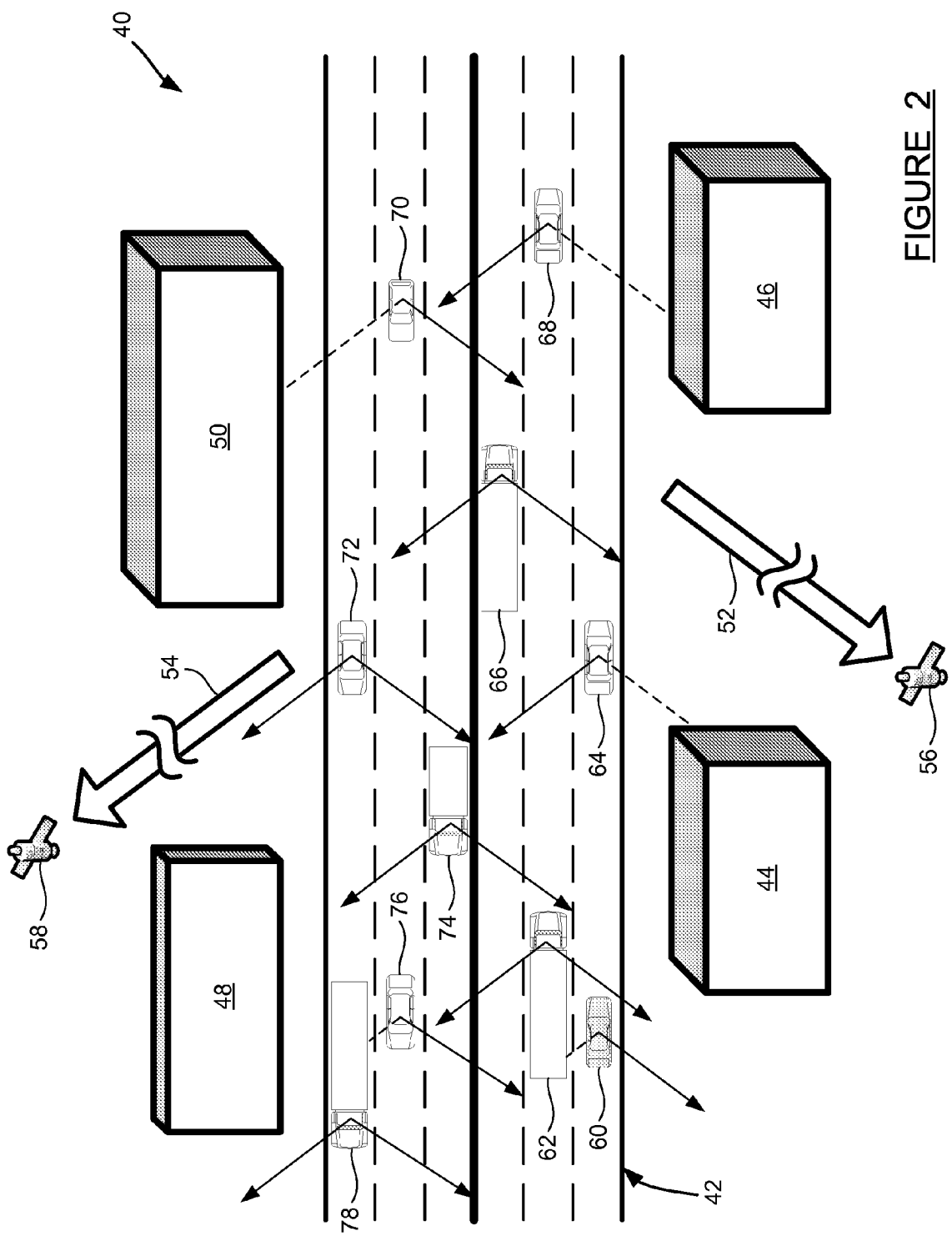
FIG. 2 is a plan view illustration of many vehicles equipped with GNSS navigation receivers, and their ability to receive satellite signals based on their surroundings.

FIG. 2 is a plan view illustration of an environment 40 including many vehicles equipped with GNSS navigation receivers and V2X communications capability. A six-lane divided roadway 42 is situated between buildings 44, 46, 48, and 50. Arrows 52 and 54 indicate the azimuth direction to GNSS satellites 56 and 58, respectively. In this example, the satellites 56 and 58 are at fairly low elevation angles, and thus their signals could be blocked by lateral obstructions for some vehicles. Other GNSS satellites, not shown, may be available at high elevation angles for the vehicles in the environment 40.

A host vehicle 60, equipped with a GNSS receiver, is driving on the roadway 42, and communicating with other vehicles 62-78 via V2X. At the instant shown in the environment 40, the host vehicle 60 has a clear signal path to the satellite 56, as indicated by the solid line with arrowhead emanating from the host vehicle 60. The signal path from the host vehicle 60 to the satellite 58 is blocked by the truck 62, as indicated by the dashed line with no arrowhead emanating from the host vehicle 60. Because the satellites 56 and 58 are actually thousands of miles away from the roadway 42, the azimuth angles from the host vehicle 60 to the satellites 56 and 58 must be parallel to the arrows 52 and 54, even though the lines from the host vehicle 60 do not appear to point at the satellites 56 and 58 in the FIG. 2 illustration. The same is true, of course, for all vehicles in the environment 40, as the distances to the satellites 56 and 58 are not shown to scale.

The lines emanating from each of the vehicles 62-78 depict their individual situation, as follows; the truck 62 has a clear signal path to both the satellites 56 and 58; the car 64 has its signal path to the satellite 56 blocked by the building 44, while its signal path to the satellite 58 is clear; the truck 66 has a clear signal path to both the satellites 56 and 58; the car 68 has its signal path to the satellite 56 blocked by the building 46, while it is far enough from the building 50 that its signal path to the satellite 58 is clear; the car 70 has a clear signal path to the satellite 56, while its path to the satellite 58 is blocked by the building 50; the car 72 has a clear signal path to both the satellites 56 and 58, as it is far enough from the building 44 that there is no obstruction of the signal from the satellite 56; the truck 74 has a clear signal path to both the satellites 56 and 58, as the building 48 is short and the truck 74 is in the left-hand lane; the car 76 has a clear signal path to the satellite 56, while its path to the satellite 58 is blocked by the truck 78; and the truck 78 has a clear signal path to both the satellites 56 and 58.

In the scenario depicted in the environment 40, the host vehicle 60 receives position and GNSS measurement data from all of the vehicles 62-78 via V2X communications. The host vehicle 60 can derive a lot of information from this data. At a minimum, the host vehicle 60 will learn that other vehicles have lost their signal from the satellite 56 when they passed by the buildings 44 and 46, so the host vehicle 60 can expect the same to happen to it.

Beyond determining where signal blockages can be expected, the host vehicle 60 can even estimate sizes, shapes, locations and porosity of obstructions, given the GNSS data from other nodes in the V2X network. For example, if the host vehicle 60, and the cars 64 and 68, all lose their signal from the satellite 56 when passing the building 44, then the host vehicle 60 can deduce the existence of the building 44. Based on the location at which each vehicle loses and then re-gains its signal from the satellite 56, and the azimuth angle to the satellite 56 (which is known from the GNSS ephemeris or almanac), the host vehicle 60 can determine the length of the building 44. Furthermore, if the truck 66 does not lose its signal from the satellite 56 when passing by the building 44 in the left-hand lane, then the host vehicle 60 can compute information about the height of the building 44 and/or its setback distance from the roadway 42.

Over time, as more vehicles pass a certain location, and as more data is gathered by the host vehicle 60 about signal blockage from satellites at different elevation angles, obstruction length, width, height, and location information can be deduced to allow accurate prediction of where satellite visibility will be blocked for passing vehicles. This data can be used only for the current driving trip, or it can be stored for future usage, depending on the preferences of the vehicle operator.

Another type of signal blockage shown in the environment 40 comes from moving obstacles, namely trucks. This situation can also be handled more quickly and accurately by including GNSS satellite data from other vehicles via V2X. For example, the host vehicle 60 may drive alongside the truck 62 for a considerable distance. The lack of a signal from the satellite 58 could be explained by the presence of a solid row of buildings on the left side of the host vehicle 60. But knowing that the cars 64 and 68 did not experience a signal blockage in the same location, the host vehicle 60 can conclude that a tall vehicle must have been driving to its left, causing the signal blockage. This type of logic prevents a "false positive", or an indication that a building or other fixed obstruction exists, when in fact it does not.

Other scenarios, not shown in the environment 40, are also possible. For example, if all vehicles in a V2X network experience a loss of all GNSS satellite signals for a short distance at a certain location, then it is likely that the road goes under an overpass at that location. Similarly, if all vehicles in a V2X network experience a loss of all GNSS satellite signals for a long distance at a certain location, then it is likely that the road passes through a tunnel at that location. Also, a line of trees adjacent to a road could cause a partial or total loss of satellite signal in that direction, as discussed previously in relation to FIG. 1. Information about all of the obstructions—including buildings, trees, road infrastructure, etc.—can be compiled into a sky visibility map. The sky visibility map can include actual estimates of sizes, shapes, and locations of obstructions, or the map can simply include information about where satellite signal loss can be expected, such as, "eastbound on the roadway 42, signals to low-elevation satellites to the south are blocked from Location X to Location Y". The information from the sky visibility map can also be used to classify the type of driving environment that exists in any location, such as wide open rural highway, urban canyon, tunnel, or suburban tree-lined environments.

There are many potential applications for using the sky visibility map. One application is anticipation of limitations in communication system capabilities which will be experienced imminently. For example, cellular phone signals, satellite radio signals, GNSS signals, and others may be temporarily blocked by buildings, tunnels, and other obstructions. Knowing this in advance allows the opportunity to advise a driver and passengers of a vehicle, and possibly take corrective action, such as switching to a dead reckoning navigation method in absence of GNSS navigation data. It can also be advantageous to know when a certain obstruction, such as a tunnel, will be cleared. This information can also be obtained from the sky visibility map.

Another application for the sky visibility map and driving environment classification includes automatic configuration of vehicle interior and exterior lighting, such as turning on headlights in advance of entering a tunnel. In addition, the driving environment classification information can be used to configure other systems, such as object detection and lane departure warning systems. Other applications for the sky visibility map and the driving environment classification information can easily be envisioned.

Any vehicle, such as the host vehicle 60 of FIG. 2, could also share the entire sky visibility map and environment classification data with other vehicles in the V2X network. In this way, the collective knowledge of visibility obstructions would accumulate very quickly, to the benefit of all participating vehicles.

It is also possible to create the sky visibility map and environment classifier without receiving satellite signal data from other vehicles. The host vehicle 60 can simply store its own satellite visibility and obstruction data for all locations that it travels, accumulate this data over time, and use it when re-visiting any location. While it would take more time for the host vehicle 60 to build up a complete sky visibility map this way, visibility data would be available on the second pass through any locale, and thus this approach would be helpful for roads frequently traveled by the host vehicle 60. Given that almost all GNSS satellites move around the earth over time, multiple location observations may be needed to reliably estimate certain obstructions. As an example, a tunnel may be identified by only a single pass, whereas identification of a tree line or an overpass may take multiple passes. Some GNSS satellites, such as the Space-Based Augmentation Systems (SBAS), which remain fixed over time can provide information that is not time of day dependent for the purposes described herein. The method where a vehicle stores only its own data would be particularly suitable for vehicles without V2X communications capability.

Figure 3:
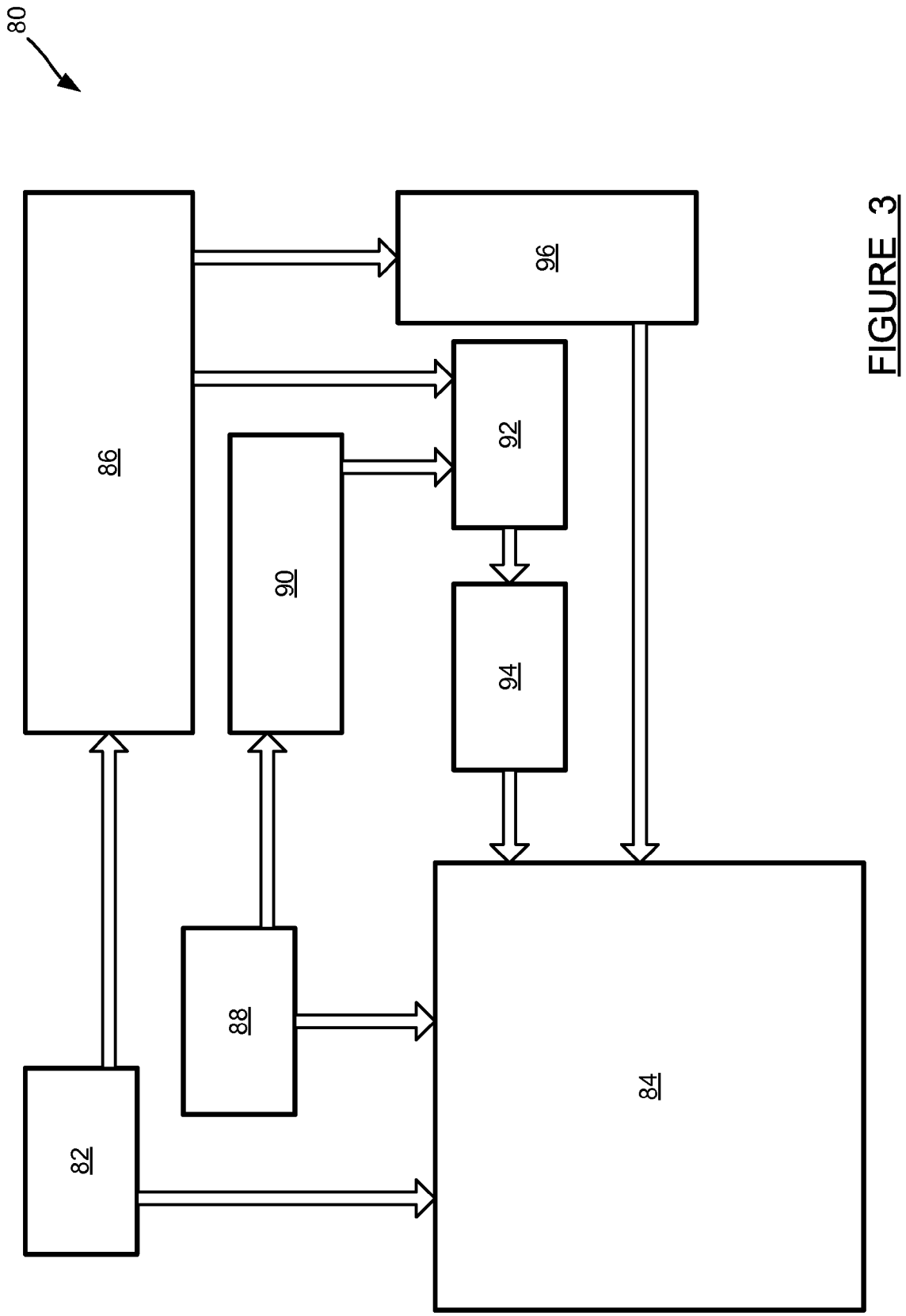
FIG. 3 is a block diagram of a system for constructing a sky visibility map and classifying a host vehicle's driving environment.

FIG. 3 is a block diagram of a system 80 for constructing a sky visibility map and classifying a driving environment. A GNSS receiver 82 in a vehicle, such as the host vehicle 60, receives satellite navigation information from two or more satellites, as described previously. The GNSS receiver 82 could be a GPS receiver or other satellite navigation system receiver. The GNSS receiver 82 provides the satellite navigation data to an applications module 84, where the data can be used directly for navigation and other purposes. The GNSS receiver 82 also provides the satellite signal data to a host vehicle data module 86. The host vehicle data module 86 processes the location of the host vehicle 60, satellite location (azimuth and elevation) information from the GNSS ephemeris or almanac, and the quality of the signal from each visible satellite. Data from the host vehicle data module 86 is used by a sky view estimator 92 to construct a sky visibility map, as discussed in detail previously.

A V2X receiver 88 receives information from other vehicles, and possibly infrastructure, pedestrians or other nodes, in a V2X network. The V2X receiver 88 can use DSRC or other communications technology. Some information from the V2X receiver 88 can be used directly by the applications module 84. GNSS satellite navigation data, including locations of the other vehicles, and the quality of signals from visible satellites, is provided to a collaborative vehicle data module 90. The collaborative vehicle data module 90 processes the locations of each vehicle which is sharing GNSS data on the V2X network, and also the quality of the signal from each visible satellite to each collaborating vehicle. Data from the collaborative vehicle data module 90 is also used by the sky view estimator 92.

The sky view estimator 92 receives data from the host vehicle data module 86 and the collaborative vehicle data module 90, and constructs a sky visibility map as discussed previously. In particular, the sky view estimator 92 determines where and under what conditions satellite signal degradation or loss can be expected. The sky view estimator 92 may also compute sizes, shapes, locations, and porosity of obstructions. At a minimum, the sky view estimator 92 stores the sky visibility map for short term use during the current driving trip. The sky visibility map may also be stored long term for future usage.

Data from the sky view estimator 92 is provided to an environment classifier 94. The environment classifier 94 determines what type of driving environment exists in locations being driven. As discussed previously, the environment types can include wide open rural highway, urban canyon, tunnel, suburban tree-lined environment, and others. Environment classification data may also be stored long term for future usage.

Data from the sky view estimator 92 and the environment classifier 94 are provided to the applications module 84. The applications module 84 can include the navigation application which uses the GNSS data directly, as well as any other application which can make use of sky visibility or driving environment information. This could include lighting systems, assisted driving systems, and others.

It is also possible to assemble useful sky view information without receiving satellite signal quality data from surrounding vehicles. Sky view information storage module 96 receives data from the host vehicle data module 86, and stores it for later use. Thus, as the host vehicle 60 travels and accumulates directional sky visibility data over time, the data log in the sky view information storage module 96 becomes more and more complete. This data log can be recalled and used whenever the host vehicle 60 revisits a route previously traveled. The sky view information storage module 96 can potentially perform all of the functions of the sky view estimator module 92, once enough sky visibility data is accumulated. The data log from the sky view information storage module 96 is provided to the applications module 84, for usage as discussed previously.

Figure 4:
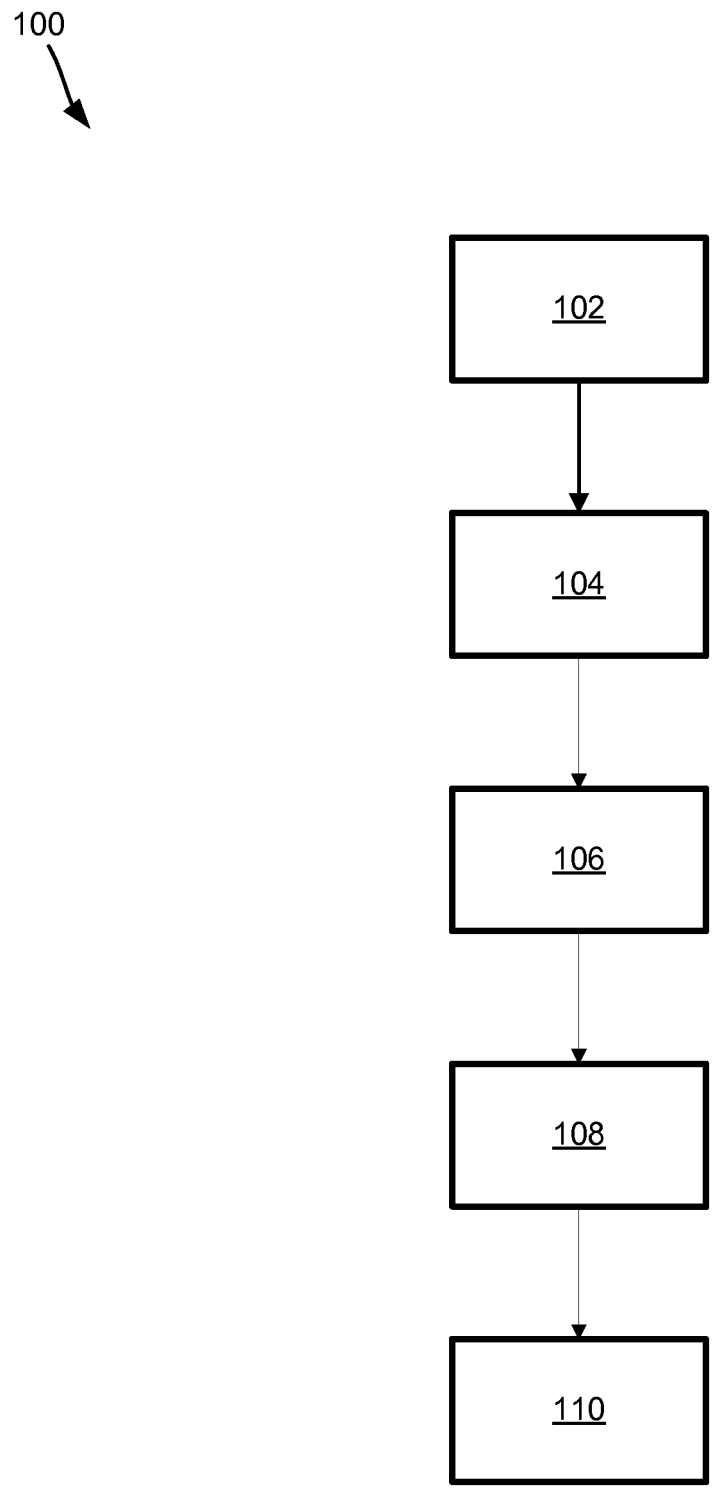
FIG. 4 is a flow chart diagram of a method for constructing a sky visibility map and classifying a host vehicle's driving environment.

FIG. 4 is a flow chart diagram 100 of a method for constructing a sky visibility map and classifying a driving environment. At box 102, position, heading, and satellite data are collected from the host vehicle's GNSS receiver. As discussed previously, satellite location information is available via the GNSS ephemeris or almanac. At box 104, position, heading, and satellite data are collected from surrounding vehicles. This data can conveniently be received via a V2X network, as discussed previously. At box 106, a map of the surrounding vehicles is created from the location data collected at the box 104.

At box 108, a sky visibility map is constructed using the map of vehicles from the box 106 and the satellite signal quality data from the boxes 102 and 104. The sky visibility map created at the box 108 includes directional sky visibility information for locations represented by all vehicles collaborating in the V2X network. The sky visibility map may also include obstruction sizes and locations as computed from the directional sky visibility information. Alternately, at the box 108, sky view information is stored for the host vehicle 60 only, and retained for future usage, as discussed previously.

At box 110, the current and approaching roadway driving environment are classified using the sky visibility information from the box 108. Environments include; wide open roadway, where good signals from all satellites would be experienced; urban canyon environment, where good signals from high elevation satellites only would be experienced, with poor or no signal from low elevation satellites; overpass, where a short duration total visibility loss would be experienced; tunnel, where a longer duration total visibility loss would be experienced; tree-lined roadway, where a low and fluctuating signal-to-noise ratio would be experienced for signals in one or both directions; and parking structure with open sides, where a weak and noisy signal from low elevation satellites could be experienced, with no signal from high elevation satellites. Other environment classifications may be possible. Environment classification data from the box 110 can be used by various vehicle systems and applications, as discussed previously.

Using the sky visibility map and driving environment classification information described above, it is possible for a vehicle to configure its navigation system and other systems for optimal performance based on driving environment and sky visibility conditions.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for constructing a sky visibility map, said method comprising:
    collecting position and other satellite data from a Global Navigation Satellite System (GNSS) receiver on a host vehicle;
    collecting position and other satellite data from vehicles surrounding the host vehicle, where the other satellite data includes satellite signal quality data;
    creating a map of the surrounding vehicles from the position data from the surrounding vehicles;
    constructing a sky visibility map from the data from the host vehicle's GNSS receiver, the data from the surrounding vehicles, and the map of the surrounding vehicles; and
    determining a driving environment classification from the sky visibility map.

2. The method of claim 1 wherein satellite locations are determined from a GNSS ephemeris or almanac and used in conjunction with the data from the host vehicle's GNSS receiver and the data from the surrounding vehicles.

3. The method of claim 1 wherein collecting position and other satellite data from surrounding vehicles includes using a vehicle-to-vehicle network.

4. The method of claim 1 wherein constructing a sky visibility map includes determining directional obstructions to sky visibility for locations on the map.

5. The method of claim 1 wherein constructing a sky visibility map includes calculating a location and size of sky visibility obstructions.

6. The method of claim 1 further comprising storing the sky visibility map and the driving environment classification in memory for future use.

7. The method of claim 1 wherein the classifications include wide open roadway, urban canyon, overpass, tunnel, tree-lined roadway, and parking structure with open sides.

8. The method of claim 1 further comprising using the sky visibility map and the driving environment classification to configure systems in the host vehicle.

9. The method of claim 1 wherein the GNSS receiver is a Global Positioning System (GPS) receiver.

10. A method for constructing a sky visibility map, said method comprising:
    collecting position, heading, and other satellite data from a Global Navigation Satellite System (GNSS) receiver on a host vehicle;
    collecting position, heading, and other satellite data from vehicles surrounding the host vehicle, where the other satellite data includes satellite signal quality data;

constructing a sky visibility map from the data from the host vehicle's GNSS receiver and the data from the surrounding vehicles;

storing the data from the host vehicle's GNSS receiver in memory; and using the data from the host vehicle's GNSS receiver when the host vehicle approaches a location that it has previously visited.

11. The method of claim 10 wherein collecting position, heading, and other satellite data from vehicles surrounding the host vehicle includes using a vehicle-to-vehicle network.

12. The method of claim 10 wherein using the data from the host vehicle's GNSS receiver when the host vehicle approaches a location that it has previously visited includes using the data to configure systems in the host vehicle.

13. A system for constructing a sky visibility map, said system comprising:

a host vehicle data storage module for storing Global Navigation Satellite System (GNSS) data for a host vehicle, where the GNSS data includes vehicle position, vehicle heading, and satellite signal data;

a surrounding vehicle data storage module for storing GNSS data for one or more vehicles which are in proximity to the host vehicle;

a sky visibility estimator module for creating a sky visibility map based on the GNSS data from the host vehicle data storage module and the surrounding vehicle data storage module; and an environment classifier module for determining a driving environment classification from the sky visibility map.

14. The system of claim 13 wherein the GNSS data for the one or more vehicles which are in proximity to the host vehicle is received by the host vehicle via a vehicle-to-vehicle network.

15. The system of claim 13 further comprising an applications module for using the sky visibility map and the driving environment classification to configure systems in the host vehicle.

16. The system of claim 13 wherein the GNSS data for the host vehicle is retained for future use in predicting sky visibility when the host vehicle approaches a location for which stored data is available.

\* \* \* \* \*